(12) United States Patent  
Poe (10) Patent No.: US 7,108,270 B2
(45) Date of Patent: Sep. 19, 2006

(54) ALL-WEATHER SLED (76) Inventor: Albert D. Poe, 1226 Evergreen Rd., Wilmington, DE (US) 19803

( * ) Notice: Subject to any disclaimer, the term of this patent is extended or adjusted under 35 U.S.C. 154(b) by 0 days.

(21) Appl. No.: 10/938,811

(22) Filed: Sep. 10, 2004

(65) Prior Publication Data

US 2005/0057007 A1    Mar. 17, 2005

Related U.S. Application Data (60) Provisional application No. 60/502,808, filed on Sep. 15, 2003.

(51) Int. Cl.
*A63C 5/00* (2006.01)
(52) U.S. Cl. .................. 280/7.12; 280/7.14; 280/8; 280/9; 280/14; 280/15; 280/16; 280/17; 280/27; 280/28.11
(58) Field of Classification Search ............... 280/7.12, 280/7.14, 8, 9, 10, 11, 13, 14, 15, 16, 17, 280/22.1, 26–27, 28.11
See application file for complete search history.

(56) References Cited

U.S. PATENT DOCUMENTS

| | | | |
|---|---|---|---|
| 1,410,701 A * | 3/1922 | Metzger ................ | 280/7.12 |
| 1,459,371 A * | 6/1923 | Kelly ..................... | 280/11 |
| 1,654,465 A * | 12/1927 | Kelly ..................... | 280/11 |
| 2,106,530 A * | 1/1938 | Kelly ..................... | 280/9 |
| 2,595,839 A | 5/1952 | Gellenbeck | |
| 2,647,759 A * | 8/1953 | Moffitt ................... | 280/8 |
| 2,743,112 A * | 4/1956 | Lambert ................. | 280/9 |
| 2,750,198 A | 6/1956 | Moore et al. | |
| 3,153,543 A | 10/1964 | Magyar | |
| 3,226,130 A | 12/1965 | Smith | |
| 3,345,080 A * | 10/1967 | Schneiderman ........ | 280/8 |
| 4,159,119 A * | 6/1979 | Smith ..................... | 280/9 |
| 4,193,608 A | 3/1980 | Gunderson | |
| 4,194,753 A | 3/1980 | Schrishuhn, Jr. | |
| 4,244,593 A | 1/1981 | Malone | |
| 4,291,891 A | 9/1981 | Blanchette | |
| 4,323,258 A | 4/1982 | Culpeper | |
| 4,337,957 A | 7/1982 | Heine | |
| 4,796,902 A * | 1/1989 | Capra ..................... | 280/16 |
| 5,060,534 A | 10/1991 | Yoshigai | |
| 5,293,965 A | 3/1994 | Nagano | |
| 5,413,361 A | 5/1995 | Mosher | |
| 5,547,204 A | 8/1996 | Gamzo | |
| 6,209,894 B1 | 4/2001 | Walker, IV | |
| 6,612,388 B1 | 9/2003 | Henderson | |
| 2001/0028155 A1* | 10/2001 | Way et al. ............. | 280/87.01 |
| 2004/0051262 A1* | 3/2004 | Young ..................... | 280/7.12 |

\* cited by examiner

*Primary Examiner*—J. Allen Shriver
(74) *Attorney, Agent, or Firm*—RatnerPrestia (57) ABSTRACT

A convertible sled for use by a rider. The convertible sled includes a body, a mounting unit coupled to the body for coupling plural wheels or plural sledding members, and a steering unit moveably coupled to the body at the front portion of the body such that, when the convertible sled is arranged in a first configuration, the steering unit is operatively coupled to at least two of the plural pairs of wheels, as steering wheels, for steering the convertible sled. Further, the steering wheels on a first side of the body pivot about a first common point and the steering wheels on a second side of the body pivot about a second common point different from the first common point. Moreover, when the convertible sled is arranged in the second configuration, the steering unit is operatively coupled to a portion of the plural sledding members for steering the convertible sled.

17 Claims, 5 Drawing Sheets

ALL-WEATHER SLED

RELATED APPLICATION

This application claims the benefit of priority to U.S. Provisional Patent Application Ser. No. 60/502,808, filed on Sep. 15, 2003, the contents of which are incorporated in this application by reference.

TECHNICAL FIELD

This invention relates, in general, to sleds, and, more particularly, to a convertible, all-weather sled that can be easily converted for use on all terrains and that includes a steering mechanism capable of steering on all terrains.

BACKGROUND OF THE INVENTION

It is well known that conventional sleds include sledding runners attached to sled to facilitate travel in snow or ice-covered environments. These sleds cannot be readily used, however, on high-friction terrains such as, for example, grass or concrete surfaces. Conventional sleds having both wheels and sledding members have been proposed for use on snow and land. These conventional sleds have a number of drawbacks, however, some of which are highlighted below.

These convertible sleds typically include either no steering system or, otherwise, include a rudimentary steering system that generally includes only a single pivot point for all of the steering wheels and all of the steering sledding members. Such a conventional steering system has the problem that, as the rider increases a turning angle (i.e., reduces the turning radius of the conventional sled), the conventional sled becomes more unstable due to the reduced distance of the wheel to the center line of the conventional sled. Moreover, lateral force on each of the steering wheels and steering sledding members is increased compared to having a pivot point for each set of steering wheels or each steering sledding member on a respective side of a sled. The conventional steering system also requires a bulkier frame and requires more force from a rider to steer the conventional sled.

In the conventional convertible sled, typically, only one set of steering wheels or steering sledding members is provided. Consequently, the rider can easily lose steering control when the wheels or members skid or skip. The risk of skids and skips increases, in particular, for uneven terrains such as grass and other off-road surfaces.

The conventional convertible sled generally does not include a braking system, or, otherwise, is implemented with a braking system which is difficult to control. Typically, the braking system may be a foot-applied brake having only a limited amount of braking feedback or, otherwise, may not be provided in a natural position of a hand of the rider.

Further, the conventional convertible sled does not provide for removal and replacement of the plural wheels. Therefore, the conventional convertible sled cannot be used with wheels of varying types and sizes optimized for specific terrain.

Still further, the conventional convertible sled does not include a large number of wheels (e.g., ten wheels). Nor does the conventional convertible sled have a high portion of them (e.g., four wheels) acting as steering wheels. Thus, the conventional convertible sled is not adaptable for most off-road terrains and steering control over such terrains is not adequate.

To overcome the shortcomings of conventional convertible sleds identified above, what is needed is an improved convertible sled suitable for all terrains.

SUMMARY OF THE INVENTION

To meet this and other needs, and in view of its purposes, the present invention provides, according to one exemplary embodiment, a convertible sled for use by a rider. The sled is configured to convertibly use one or both of a plurality of wheels in a first configuration and at least one sledding member in a second configuration. The convertible sled includes a body having a first side and a second side, a front portion, and a top surface configured to support the rider. Further included is a mounting unit coupled to the body for coupling one or more of the plurality of wheels in the first configuration such that the wheels are arranged along the first and second sides in pairs and of the at least one sledding member in the second configuration. If plural sledding members are included, they may be arranged along the first and second sides in pairs.

A steering unit is moveably coupled to the body at the front portion of the body such that, when the convertible sled is arranged in the first configuration, the steering unit is operatively coupled to at least two of the plural pairs of wheels, as steering wheels, for steering the convertible sled. The steering wheels on the first side of the body pivot about a first common point and the steering wheels on the second side of the body pivot about a second common point different from the first common point. When the convertible sled is arranged in the second configuration, the steering unit is operatively coupled to a portion of the at least one sledding member for steering the convertible sled.

According to another exemplary embodiment of the present invention, the convertible sled includes a body having a front portion, a back portion, and a top surface configured to support a rider. A mounting unit is coupled to the body for coupling multiple sets of wheels in a first configuration, at least one sledding member in a second configuration, or both. A steering member is rotatably coupled to the body at the front portion of the body and operatively coupled to at least one set of wheels for steering the convertible sled when the convertible sled is arranged in the first configuration or to the at least one sledding member for steering the convertible sled when the convertible sled is arranged in the second configuration. A hand brake is coupled to the steering member and configured to be applied by a gripping motion of a hand of the rider. The hand brake is operatively connected to the wheels when the convertible sled is arranged in the first configuration.

According to yet another exemplary embodiment of the present invention, a convertible sled is provided for use by a rider. The sled is configured to convertibly use one or both of five sets of wheels in a first configuration and two sets of sledding members in a second configuration. The convertible sled includes a body having a front portion, a back portion, and a top surface configured to support the rider. A mounting unit is coupled to the body for coupling one or both of the five sets of wheels when the convertible sled is arranged in the first configuration and of the two sets of sledding members when the convertible sled is arranged in the second configuration. A steering member is rotatably coupled to the body at the front portion of the body and is operatively coupled to one or both of the wheels, for steering the convertible sled when the convertible sled is arranged in the first configuration, and the sledding members for steering the convertible sled when the convertible sled is arranged in the second configuration.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
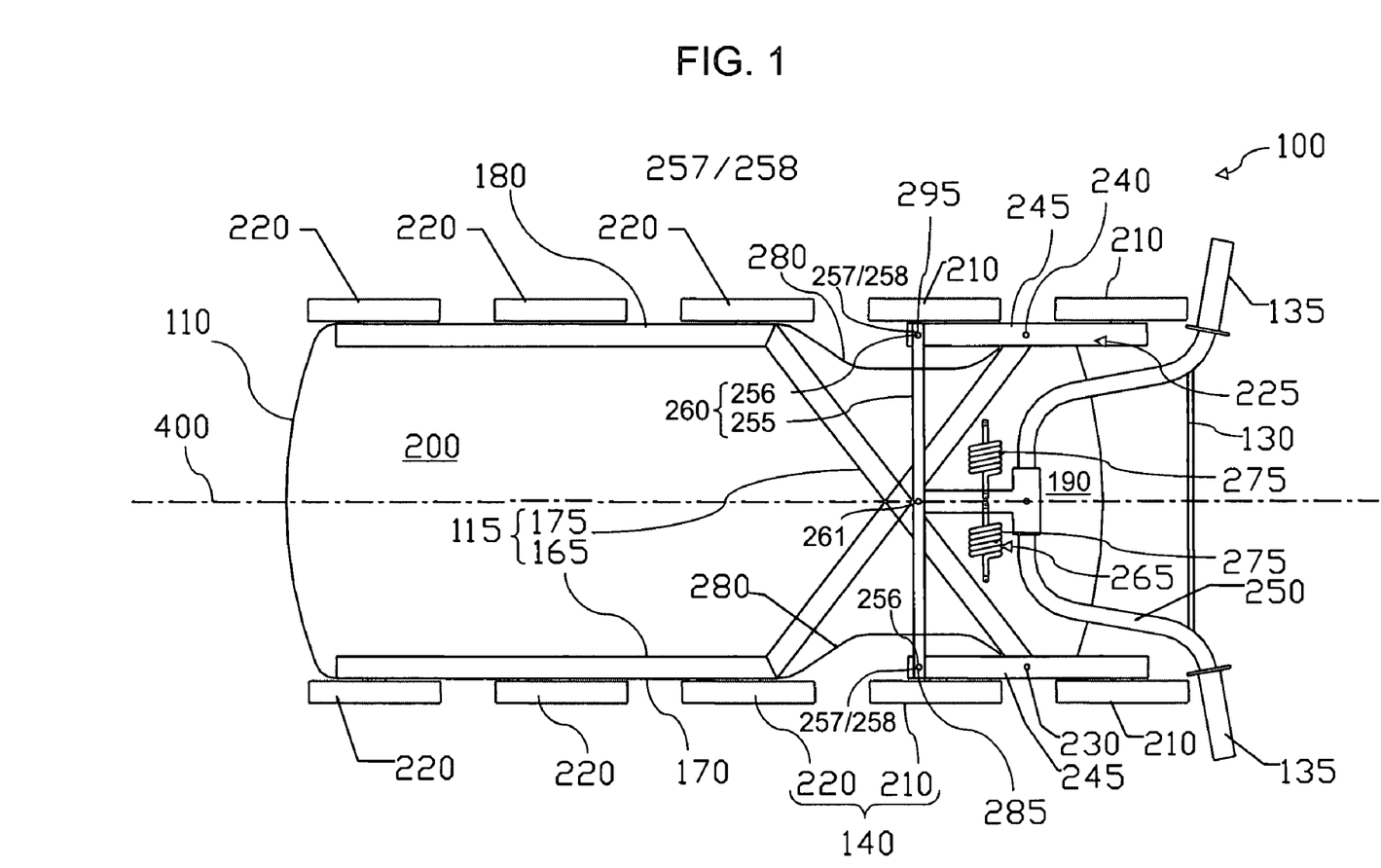
FIG. 1 is a partial bottom view illustrating a convertible sled in a first convertible configuration according to a first exemplary embodiment of the present invention.
Figure 2:
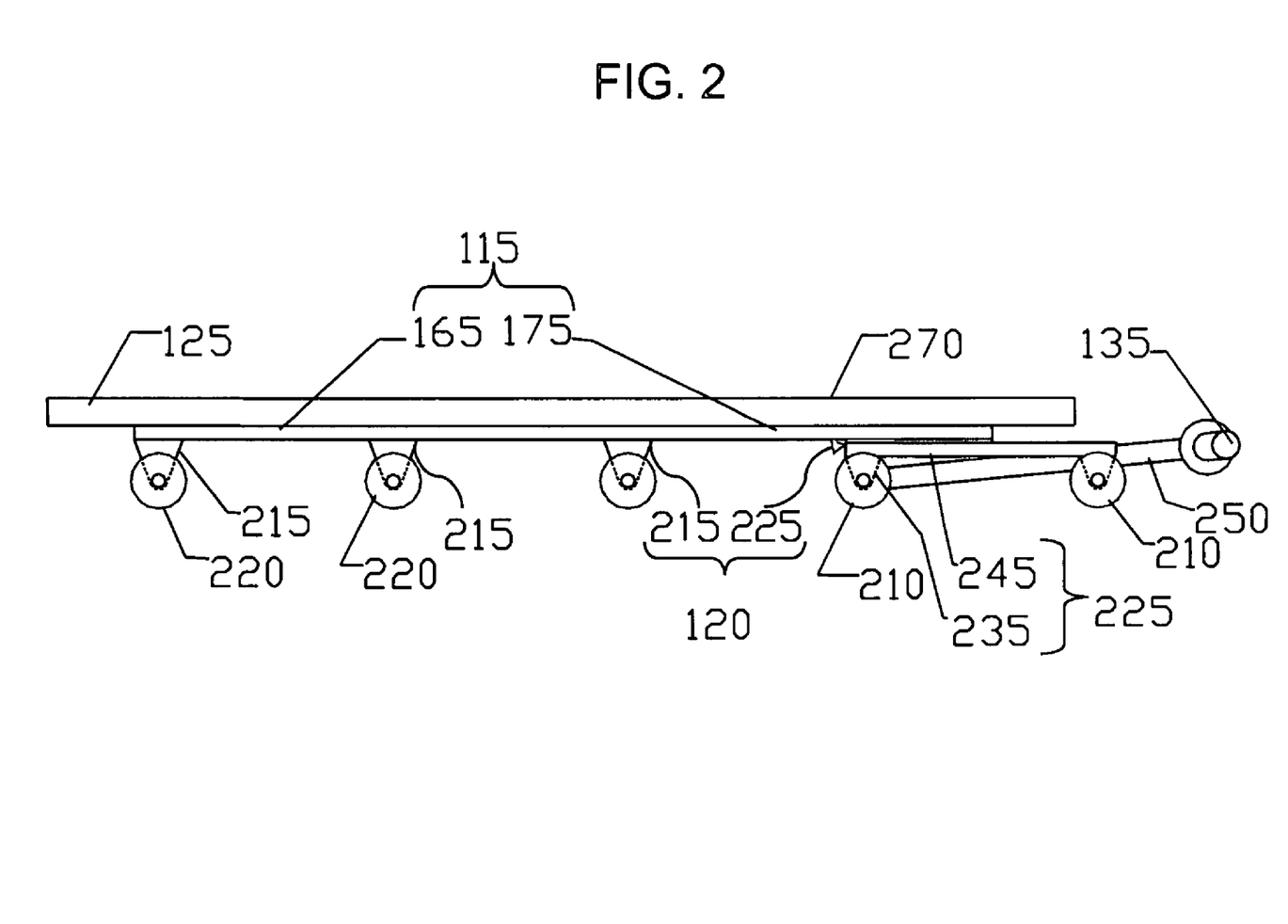
FIG. 2 is a partial side view illustrating the convertible sled in the first convertible configuration of FIG. 1.
Figure 3:
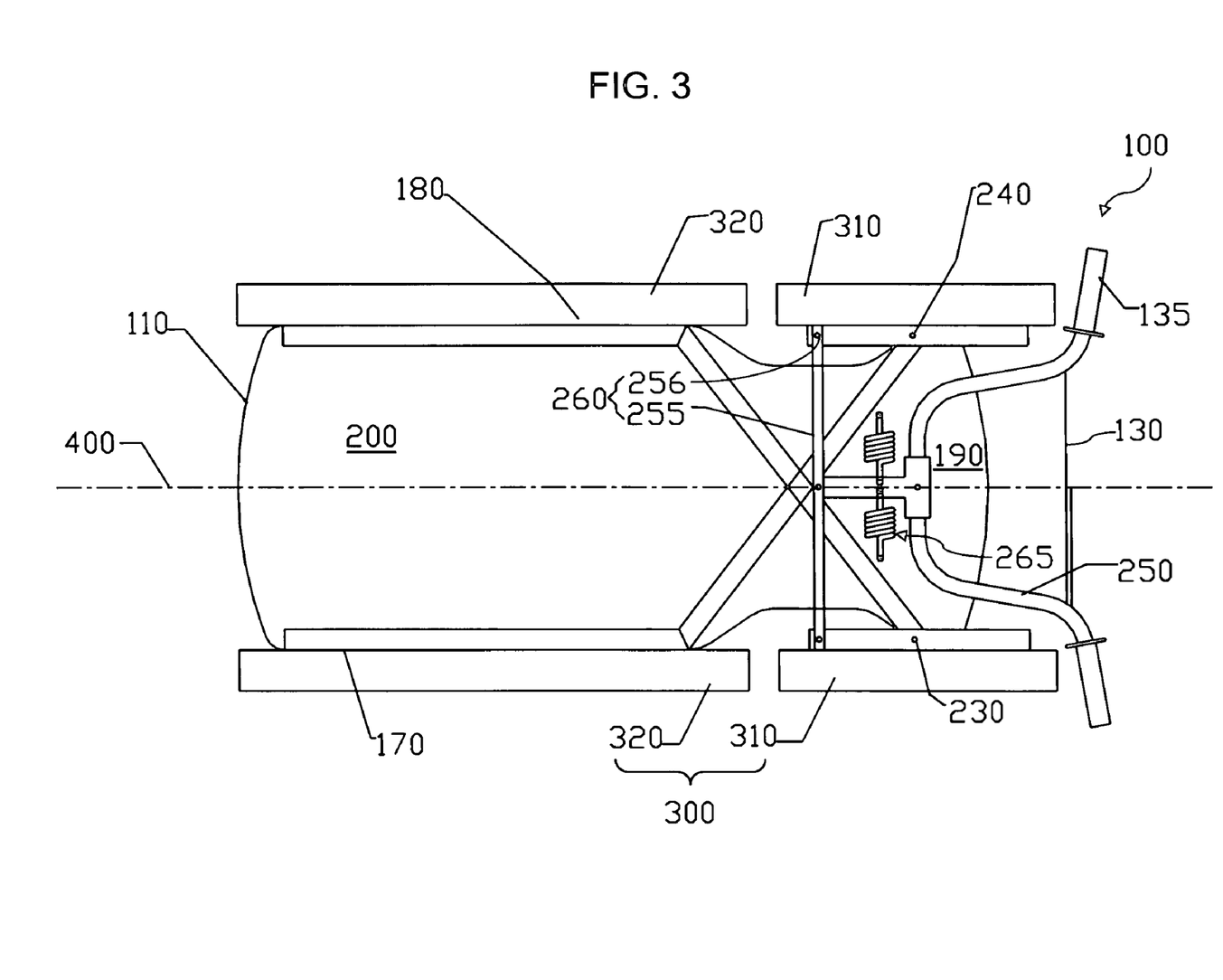
FIG. 3 is a partial bottom view illustrating the convertible sled in the second convertible configuration according to the first exemplary embodiment of the present invention.
Figure 4:
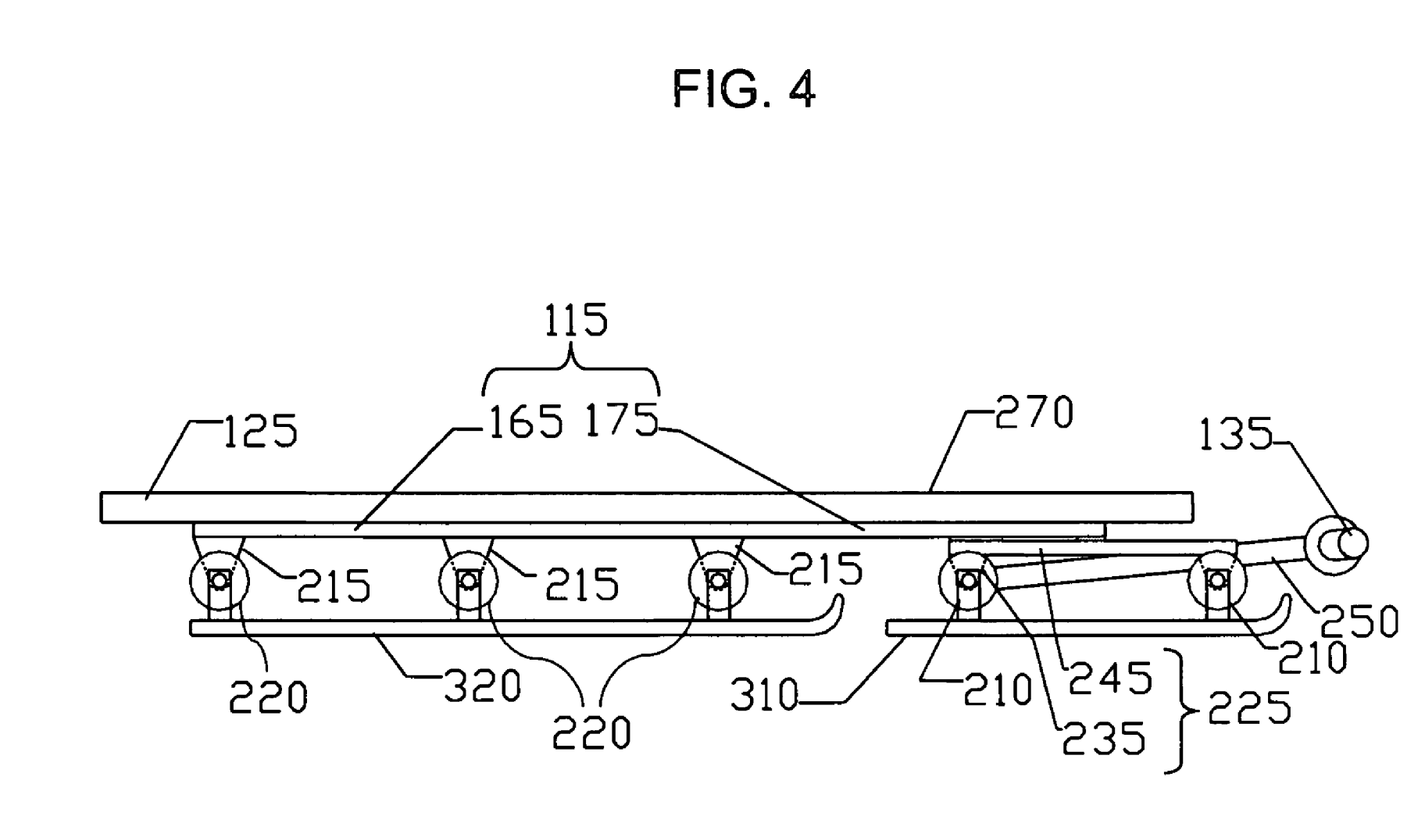
FIG. 4 is a partial side view illustrating the convertible sled in the second convertible configuration according to the first exemplary embodiment of the present invention.

Referring now to the drawing, in which like reference numbers refer to like elements throughout the various figures that comprise the drawing, FIGS. 1–4 are various views illustrating a convertible sled according to a first exemplary embodiment of the present invention. For simplicity, a braking unit is highlighted in FIG. 5 but is not shown in FIGS. 1–4. More particularly, FIG. 1 is a partial bottom view in a first configuration in which a plurality of wheels are coupled to a bottom of a body of the convertible sled. FIG. 2 is a partial side view of FIG. 1. FIG. 3 is a partial bottom view according to a second configuration in which multiple sledding members are coupled to a bottom of a body of the convertible sled. FIG. 4 is a partial side view of FIG. 3.

Referring to FIGS. 1 and 2, a convertible sled 100 is shown in a first configuration. In this configuration, the convertible sled 100 includes a sled body 110, a mounting unit 120, a steering unit 130, a plurality of wheels 140, and a braking unit 150 (see FIG. 5). The sled body 110 may be desirably made of a cast aluminum frame 115 with a plastic composite top; a light-weight subframe integrated with a top surface, such as a light-weight steel subframe integrated with a fiberglass top surface; a chromium-molybdenum subframe integrated with a plastic top surface; or any other subframe or frame sufficiently strong and rigid to suitably mount the plurality of wheels 140, a plurality of sledding members 300 (see FIGS. 3 and 4), or both to the structure. The top surface 125 of the sled body 110 is sufficiently molded or textured to keep a rider that is sitting or lying on the top surface 125 from sliding off the top surface 125 of the sled body 110 during sharp turns (i.e., during turns at a minimum turning radius) of the convertible sled 100. The cast aluminum frame 115 may preferably comprise a plurality of longitudinal frame portions 165 disposed substantially adjacent a back portion 200 of the sled body 110 and a steering reinforcement frame portion 175 connected to the longitudinal frame portions 165, for example, by integrally forming in a casting operation the entire cast aluminum frame 115. The mounting unit 120 may be attached to the cast aluminum frame 115 at opposite sides 170 and 180 of the sled body 110.

It is contemplated that a plurality of longitudinal frame portions 165 and the steering reinforcement frame portion 175 may be separate parts and may be coupled together (e.g., may be welded together). It is also contemplated that, if the integrated light weight subframe is used, then the mounting unit 120 may be mounted directly into the integrated light weight subframe.

The sled body 110 may include a front portion 190 and the back portion 200 such that a portion of the plurality of wheels 140 disposed at a periphery of or under the front portion 190 of the sled body 110 may be steering wheels 210 that may be configured to be pivoted to steer the convertible sled 100 and a remaining portion of the plurality of wheels 140 disposed at a periphery of or under the back portion 200 of the sled body 110 may be fixed wheels 220 that may be configured to remain fixed (i.e., these fixed wheels 220 may not pivot and, otherwise, may allow the convertible sled 100 to roll in a direction extending along a longitudinal axis 400 of the convertible sled 100). That is, the convertible sled 100 may have plural pairs of wheels 140, each of the wheels 140 of a respective pair being disposed at the periphery of or under a respective opposite side 170 and 180 of the sled body 110.

The mounting unit 120 may be coupled to the sled body 110 to couple the plurality of wheels 140 to the sled body 110, for example, to the cast aluminum frame 115 or the light-weight integrated subframe, when the convertible sled 100 is arranged in the first configuration, such that the plurality of wheels 140 are arranged along the first and second sides 170 and 180 in pairs.

The mounting unit 120 may include one or more attachment units of a fixed type 215 to removably couple corresponding fixed wheels 220 to the sled body 110. The corresponding fixed wheels 220 may correspond to the remaining wheels 140, which are non-steerable wheels, when the convertible sled 100 is arranged in the first configuration.

The mounting unit 120 may further include one or more attachment units of a pivoting type 225 to removably couple corresponding steering wheels 210 to the sled body 110 when the convertible sled 100 is arranged in the first configuration. Moreover, each of the attachment units of the pivoting type 225 may include a mounting portion 235 to mount the steering wheels 210 and an extension portion 245 to pivotally couple with a crossbar 255 of a coupling unit 260 at respective ends of the crossbar 255. As a steering member 250 is moved in a direction extending from the first side 170 to the second side 180, the steering wheels 210 on the first side 170 may pivot about a first common point 230 in a first rotational direction and the steering wheels 210 on the second side 180 may pivot about a second common point 240 in the first rotational direction. Further, as the steering member 250 is moved in a direction extending from the second side 180 to the first side 170, the steering wheels 210 on the first side 170 may pivot about the first common point 230 in a second rotational direction and the steering wheels 210 on the second side 180 may pivot about the second common point 240 in the second rotational direction. Because a mean distance between the steering wheels 210 and a center line 400 of the sled body 110 is not changed (i.e., is maintained) as the turning radius is decreased, the convertible sled 100 has significantly improved stability over the conventional convertible sleds.

The steering unit 130 may be moveably coupled to the sled body 110 at the front portion 190 of the sled body 110 such that, when the convertible sled 100 is arranged in the first configuration, the steering unit 130 may be operatively coupled to plural pairs of the wheels 140, as the steering wheels 210, for steering the convertible sled 100. Moreover, the steering wheels 210 on the first side 170 of the sled body 110 may pivot about the first common point 230 and the steering wheels 210 on the second side 180 of the sled body 110 may pivot about the second common point 240 which is different from the first common point 230.

The steering unit 130 may include the steering member 250 configured to enable the rider to steer the convertible sled 100 and the coupling unit 260 configured to link the steering member 250 with one or more of the steering wheels 210 to pivot the steering wheels 210 according to a movement of the steering member 250. The steering member 250 may include at each gripping end of the steering member 250 a gripping unit 135 made of a textured and flexible material such as rubber or plastic to allow the user (i.e., the rider) to comfortably grip the gripping unit 135.

The coupling unit 260 may desirably include the crossbar 255 projecting in opposite directions from the steering member 250 and coupled to the steering member 250 by a coupling unit 261, for example, one or more through bolts with corresponding nuts attached to the bolts. Although a crossbar 255 is illustrated, it is contemplated that any other linking unit to pivotally link each of the sets of steering wheels 210 on opposite sides to the steering member 250 may be used as long as the rider can easily provide the force need to turn the steering member 250 to pivot the steering wheels 210 or, otherwise, the steering sledding member 320 (see FIGS. 3 and 4). The coupling unit 260 may further include pivot pins 256 to pivotally couple the crossbar 255 to the extension portion 245 of respective attachment units of the pivoting type 225 by corresponding through holes 257 and 258 of the crossbar 255 and the extension portion 245 of the respective attachment units of the pivoting type 225.

The steering unit 130 may further include a steering biasing unit 265 to bias the steering wheels 210 in a direction substantially parallel to the longitudinal axis 400 of the convertible sled 100. The steering biasing unit 265 may preferably include, for example, two springs 275 symmetrically disposed on opposite sides of the steering member 250 or, otherwise, may be any device, for example, a pneumatic device, that provides restoring force to cause the steering wheels 210 to return to center positions (i.e., the steering wheels 210 being biased in a direction substantially parallel to the longitudinal axis 400 of the convertible sled 100). Moreover, it is preferred that the restoring force (i.e., biasing) provided by the steering biasing unit 265 increases as the turning angle of the steering member 250 increases.

Although the steering biasing unit 265 is illustrated as coupling to the steering member 250, there are any number of other positions to place, for example, two or more springs to produce a substantially similar effect, for example, at or near pivotal coupling points 285 and 295 defined by the crossbar 255 and the extension portion 245 of respective attachment units of the pivoting type 225.

The plurality of wheels 140 may comprise at least five pairs of wheels 140 provided under or adjacent to opposite sides of the sled body 110 and, for example, may include three sets of fixed wheels 220 in longitudinal succession and two sets of steering wheels 210 in further longitudinal succession relative to the three sets of fixed wheels 220 for each of the opposite sides 170 and 180. Thus, when the plurality of wheels 140 are arranged in such a configuration, each of the fixed wheels 220 is substantially aligned in a common direction that is substantially parallel to the longitudinal axis 400 of the sled body 110.

It is contemplated that, when the convertible sled 100 is arranged in the first configuration, at least the top surface 125 of a center portion 270 of the sled body 110 of the convertible sled 100 may be at or below the highest elevation above ground level of each of the plurality of wheels 140.

Although the center portion 270 is illustrated as a flat surface, it is contemplated that the surface may be molded to fit a general contour of the user. Further, the center portion 270 may have an elevation that is below other portions of the top surface to lower the center of mass of a combination of the convertible sled 100 and the rider.

It is contemplated that, when the convertible sled 100 is arranged in the first configuration, each of the wheels 140 may be one of first through third types such that the first type of wheels 140 may include air wheels for use on off-road terrains and may have a diameter in a range of about 6 to 8 inches, the second type of wheels 140 may include hard rubber wheels for use on grass terrains and may have a diameter of about 6 inches, and the third type of wheels 140 may include urethane wheels with high-speed bearings for use on paved terrains and may have a diameter of about 4 inches.

The sled body 110 may further include a cutaway portion 280 on each side of the front portion 190 of the sled body 110 such that, when the convertible sled 100 is arranged in the first configuration, the cutaway portion 280 on a respective side 170 and 180 of the sled body 110 provides sufficient clearance for the steering wheels 210 on the respective side 170 and 180 to pivot at least plus or minus 400 from the direction extending along the longitudinal axis 400 of the sled body 110 and preferably sufficient clearance for the steering wheels 210 on the respective side 170 and 180 to pivot in the range of plus or minus 300 from the direction extending along the longitudinal axis 400 of the sled body 110.

Now referring to FIGS. 3 and 4, for brevity, elements of the first embodiment of the present invention that are in common between the first and second configurations generally will not be discussed below.

With respect to the second configuration, the sled body 110 may include the front portion 190 and the back portion 200 such that a portion of the plurality of sledding members 300 disposed at a periphery of or under the front portion 190 of the sled body 110 may be steering sledding members 310 that may be configured to be pivoted to steer the convertible sled 100 and a remaining portion of the plurality of sledding members 300 disposed at a periphery of or under the back portion 200 of the sled body 110 may be fixed sledding members 320 that may be configured to remain fixed (i.e., these fixed sledding members may not pivot and, otherwise, may allow the convertible sled 100 to travel in a direction extending along a longitudinal axis 400 of the sled body 110) when the convertible sled 100 is arranged in the second configuration. That is, the convertible sled 100 may have plural pairs of sledding members 300, each of the sledding members 300 of a respective pair being disposed at the periphery of or under a respective opposite side 170 and 180 of the sled body 110.

The mounting unit 120 may be coupled to the sled body 110 to couple the plurality of sledding members 300 to the sled body 110, for example, to the cast aluminum frame 115 or the light-weight integrated subframe, when the convertible sled 100 is arranged in the second configuration, such that the plurality of sledding members 300 are arranged along the first and second sides 170 and 180 in pairs.

The mounting unit 120 may include one or more attachment units of a fixed type 215 to removably couple corresponding fixed sledding members 320 to the sled body 110. The corresponding fixed sledding members 320 may correspond to the remaining sledding members 300 that are non-steerable sledding members, when the convertible sled 100 is arranged in the second configuration.

The mounting unit 120 may further include one or more attachment units of a pivoting type 225 to removably couple corresponding steering sledding members 310 to the sled body 110 when the convertible sled 100 is arranged in the second configuration. Moreover, each of the attachment units of the pivoting type 225 may include a mounting portion 235 to mount the steering sledding members 310 and the extension portion 245 to pivotally couple with the crossbar 255 of the coupling unit 260 at the respective ends of the crossbar 255. As the steering member 250 is moved in the direction extending from the first side 170 to the second side 180, the steering sledding member or sledding members 310 on the first side 170 may pivot about the first common point 230 in the first rotational direction and the steering sledding member or sledding members 310 on the second side 180 may pivot about the second common point 240 in the first rotational direction. Further, as the steering member 250 is moved in the direction extending from the second side 180 to the first side 170, the steering sledding member or sledding members 310 on the first side 170 may pivot about the first common point 230 in the second rotational direction and the steering sledding member or sledding members 310 on the second side 180 may pivot about the second common point 240 in the second rotational direction.

That is, the steering unit 130 may be moveably coupled to the sled body 110 at the front portion 190 of the sled body 110 such that, when the convertible sled 100 is arranged in the second configuration, the steering unit 130 may be operatively coupled to one or more pairs of the sledding members 300, such as the steering sledding members 310, for steering the convertible sled 100. Moreover, the steering sledding member or sledding members 310 on the first side 170 of the sled body 110 may pivot about the first common point 230 and the steering sledding member or sledding members 310 on the second side 180 of the sled body 110 may pivot about the second common point 240 which is different from the first common point 230.

When the convertible sled 100 is arranged in the second configuration, the coupling unit 260 is configured to link the steering member 250 with at least one of the steering sledding members 310 to pivot the steering sledding members 310 according to a movement of the steering member 250.

The plurality of sledding members 300 may comprises at least two pairs of opposite sledding members 300 provided at the periphery of or under opposite sides of the sled body 110 and, for example, may include one pair of fixed sledding members 320 and one pair of steering sledding members 310 in longitudinal succession with one pair of fixed sledding members 320 for each of the opposite sides 170 and 180. That is, when the plurality of sledding members 300 are arranged in this configuration, each of the fixed sledding members 320 and the steering sledding members 310 in a center steering position is substantially aligned in a common direction that is substantial parallel to the longitudinal axis 400 of the sled body 110.

It is contemplated that the convertible sled 100 may be configured with runners integrated into the sled body 110 such that, when the plurality of wheels 140 are removed in the second configuration, the integrated runners on the sled body 110 may substitute for the plurality of sledding members 300 for hardpacked snow and icy terrains.

Although it is illustrated that the convertible sled 100 may be configured such that the plurality of sledding members 300 may be mounted to the sled body 110 at common mounting locations as those for the plurality of wheels 140 and the plurality of wheels 140 are not removed, it is contemplated that the sledding members may be mounted to the sled body 110 at common mounting locations as those for the plurality of wheels 140 with removal of the plurality of wheels 140. Such removal would reduce the overall weight of the sled body 110 and eliminate any potential drag caused by the plurality of wheels 140 when the convertible sled is arranged in the second configuration.

It is also contemplated that, when the convertible sled 100 is arranged in the second configuration, each of the sledding members 300 may be one of first or second types such that the first type of sledding member 300 may include runners for use on hard packed snow or ice and may have a width that is in a range of about 0.5 to 1 inches, and the second type of sledding member 300 may include skis for use on soft snow and may have a width that is in a range of about 2 to 4 inches.

Figure 5:
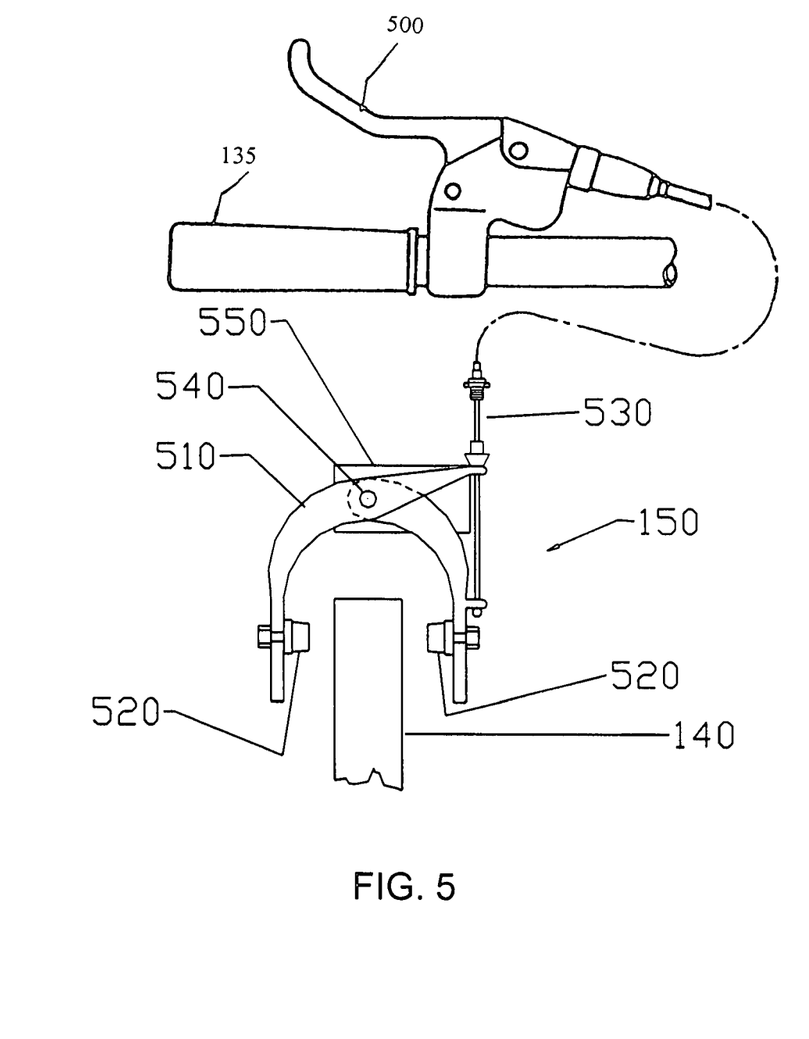
FIG. 5 is a partial view illustrating a braking system of the convertible sled in the first convertible configuration.

FIG. 5 is a partial view illustrating an exemplary braking unit 150 of the convertible sled in the first convertible configuration. The braking unit 150 may be removably coupled to the steering member 250 and may be configured to be applied by a gripping motion of a hand of the rider. The braking unit 150 may be operatively connected to a portion of the fixed wheels 220 on opposite sides 170 and 180 of the convertible sled 100, when the convertible sled 100 is arranged in the first configuration, to brake the portion of the fixed wheels 220 according to an amount of pressure applied by the gripping motion of the rider.

The braking unit 150 may include at each gripping part 135 a braking lever 500 that is removably coupled to the gripping part 135. The braking unit 150 may further include plural braking calipers 510, plural frictional braking pads 520, and plural cable wires 530. For each of the opposite wheels used for braking 140, plural frictional braking pads 520 may be mounted with a corresponding braking caliper 510 and may engage the respective braking wheel 140 according to an amount of pressure provided to the braking lever 500 by the rider. Each braking caliper 510 may be removably coupled via a braking coupling member 550 to one of the sled body 110 or the mounting unit 120 and may be biased to separate (i.e., provide a gap between) the frictional braking pads 520 and the respective wheel 140 by a biased spring 540 attached to the respective braking calipers 510. A respective cable wire 530 may be attached to the respective braking caliper 510 and may couple to the braking lever 500 on the respective gripping part 135. Further, the braking lever 500, braking calipers 510, and cable wires 530 may be removed when the convertible sled 100 is arranged in the second configuration.

Although it is illustrated that the braking lever 500 operatively connects to the braking wheels 140 by a set of cable wires 530, it is contemplated that other connections are possible, for example, hydraulic connections, pneumatic connections, and the like.

The braking calipers 510 may be configured to extend to provide a predetermined nap between respective wheels 140 and the braking pads 520 to allow easy interchange of wheels 140 of different types (i.e., wheels of the first through third types).

Although illustrated and described above with reference to certain specific embodiments, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. A convertible sled for use by a rider, and configured to convertibly use one or both of plural wheels in a first configuration and of plural sledding members in a second configuration, the convertible sled comprising:
   a body including a first side and a second side, a front portion, and a top surface configured to support the rider;
   a mounting unit coupled to the body for coupling one or both of the plural wheels in the first configuration such that the plural wheels are arranged along the first and second sides in pairs and of the plural sledding members in the second configuration such that the plural sledding members are arranged along the first and second sides in pairs; and
   a steering unit moveably coupled to the body at the front portion of the body such that, when the convertible sled is arranged in the first configuration, the steering unit is operatively coupled to at least two of the plural pairs of wheels, as steering wheels, for steering the convertible sled, the steering wheels on the first side of the body pivot about a first common point and the steering wheels on the second side of the body pivot about a second common point different from the first common point, and when the convertible sled is arranged in the second configuration the steering unit is operatively coupled to a portion of the plural pairs of sledding members for steering the convertible sled, wherein
   the portion of the plural pairs of sledding members define steering sledding members for steering the convertible sled such that, when the convertible sled is arranged in the second configuration, the steering sledding members on the first side of the body pivot about the first common point and the steering sledding member on the second side of the body pivot about the second common point, and
   the coupling unit comprises a crossbar projecting in opposite directions from the steering member one or more attachment units of a pivoting type each comprising:
   a mounting portion to mount one or both of the steering wheels and the steering sledding members, and
   an extension portion to pivotally couple with the crossbar at respective ends of the crossbar such that, as the steering member is moved in a direction extending from the first side to the second side, the steering wheels on the first side pivot about the first common point in a first rotational direction and the steering wheels on the second side pivot about the second common point in the first rotational direction and, as the steering member is moved in a direction extending from the second side to the first side, the steering wheels on the first side pivot about the first common point in a second rotational direction and the steering wheels on the second side pivot about the second common point in the second rotational direction.

2. The convertible sled according to claim 1, wherein the steering unit comprises:
   a steering member configured to enable the rider to steer the convertible sled; and
   the coupling unit configured to couple the steering member with certain of the steering wheels to pivot the steering wheels according to a movement of the steering member or configured to couple the steering member with certain of the steering sledding members to pivot the steering sledding members according to a movement of the steering member.

3. The convertible sled according to claim 1, wherein the mounting unit comprises:
   one or more attachment units of a fixed type to removably couple corresponding fixed wheels, defined by corresponding remaining wheels that are not steering wheels, to the body, when the convertible sled is arranged in the first configuration and corresponding fixed sledding members, defined by corresponding remaining sledding members that are not steering sledding members, to the body when the convertible sled is arranged in the second configuration; and
   the one or more attachment units of the pivoting type to removably couple corresponding steering wheels to the body when the convertible sled is arranged in the first configuration and corresponding steering sledding members to the body when the convertible sled is arranged in the second configuration.

4. The convertible sled according to claim 3, wherein, when the convertible sled is arranged in the first configuration, each of the fixed wheels is substantially aligned in a common direction that is substantial parallel to a length of the body.

5. The convertible sled according to claim 3, wherein, when the convertible sled is arranged in the second configuration, each of the fixed sledding members is substantially aligned in a common direction substantial parallel to a length of the body.

6. The convertible sled according to claim 3, further comprising a braking unit removably coupled to the steering member and configured to be activated by a gripping motion of a hand of the rider, the braking unit being operatively connected to a portion of the fixed wheels on opposite sides of the convertible sled, when the convertible sled is arranged in the first configuration, to brake the portion of the fixed wheels according to an amount of pressure applied by the gripping motion of the rider.

7. The convertible sled according to claim 1, wherein:
   when the convertible sled is arranged in the first configuration, the plural wheels comprise at least five pairs of wheels provided under or adjacent to opposite sides of the body of the sled; and
   when the convertible sled is arranged in the second configuration, the plural sledding members comprise two pairs of sledding members mounted to opposite sides of the body of the convertible sled at common mounting locations as those of the at least five pairs of wheels.

8. The convertible sled according to claim 1, wherein, when the convertible sled is arranged in the first configuration, the steering wheels comprise four wheels.

9. The convertible sled according to claim 1, wherein, when the convertible sled is arranged in the first configuration, the steering wheels comprise six wheels.

10. The convertible sled according to claim 1, wherein, when the convertible sled is arranged in the first configuration, each of the wheels is one of first through third types such that the first type of wheels includes air wheels for use on off-road terrains, the air wheels having a diameter in a range of about 6 to 8 inches; the second type of wheels includes hard rubber wheels for use on grass terrains, the hard rubber wheels having a diameter of about 6 inches; and the third type of wheels includes urethane wheels with high speed bearings for use on paved terrains, the urethane wheels having a diameter of about 4 inches.

11. The convertible sled according to claim 1, wherein, when the convertible sled is arranged in the second configuration, each of the sledding members is one of first or second types such that the first type of sledding members include runners having a width in a range of about 0.5 to 1 inch, the second type of sledding members include skis having a width of about 2 to 4 inches.

12. The convertible sled according to claim 1, wherein, when the convertible sled is arranged in the first configuration, the plural wheels are mounted adjacent to a periphery of the body of the convertible sled and when the convertible sled is arranged in the second configuration the plural sledding members are mounted adjacent to a periphery of the body of the convertible sled.

13. A convertible sled for use by a rider, and configured to convertibly use one or both of plural wheels in a first configuration and of plural sledding members in a second configuration, the convertible sled comprising:
   a body including a first side and a second side, a front portion, and a top surface configured to support the rider;
   a mounting unit coupled to the body for coupling one or both of the plural wheels in the first configuration such that the plural wheels are arranged along the first and second sides in pairs and of the plural sledding members in the second configuration such that the plural sledding members are arranged along the first and second sides in pairs; and
   a steering unit moveably coupled to the body at the front portion of the body such that, when the convertible sled is arranged in the first configuration, the steering unit is operatively coupled to at least two of the plural pairs of wheels, as steering wheels, for steering the convertible sled, the steering wheels on the first side of the body pivot about a first common point and the steering wheels on the second side of the body pivot about a second common point different from the first common point, and when the convertible sled is arranged in the second configuration the steering unit is operatively coupled to a portion of the plural pairs of sledding members for steering the convertible sled, wherein each of the sledding members is configured to be mounted to the mounting unit and one or more respective wheels.

14. The convertible sled according to claim 13, further comprising:
   a steering member rotatably coupled to the body at the front portion of the body and operatively coupled to one or both of at least one set of wheels for steering the convertible sled when the convertible sled is arranged in the first configuration and at least one set of sledding members for steering the convertible sled when the convertible sled is arranged in the second configuration; and
   a hand brake coupled to the steering member and configured to be applied by a gripping motion of a hand of the rider to brake the convertible sled, the hand brake being operatively connected to at least one set of wheels mounted to a back portion of the body of the convertible sled, when the convertible sled is arranged in the first configuration.

15. The convertible sled according to claim 13 further comprising:
   a steering member rotatably coupled to the body at the front portion of the body and operatively coupled to one or both of at least two set of wheels for steering the convertible sled, when the convertible sled is arranged in the first configuration, and one set of sledding members for steering the convertible sled when the convertible sled is arranged in the second configuration.

16. A convertible sled for use by a rider, and configured to convertibly use one or both of plural wheels in a first configuration and of plural sledding members in a second configuration, the convertible sled comprising:
   a body including a first side and a second side, a front portion, and a top surface configured to support the rider;
   a mounting unit coupled to the body for coupling one or both of the plural wheels in the first configuration such that the plural wheels are arranged along the first and second sides in pairs and of the plural sledding members in the second configuration such that the plural sledding members are arranged along the first and second sides in pairs; and
   a steering unit moveably coupled to the body at the front portion of the body such that, when the convertible sled is arranged in the first configuration, the steering unit is operatively coupled to at least two of the plural pairs of wheels, as steering wheels, for steering the convertible sled, the steering wheels on the first side of the body pivot about a first common point and the steering wheels on the second side of the body pivot about a second common point different from the first common point, and when the convertible sled is arranged in the second configuration the steering unit is operatively coupled to a portion of the plural pairs of sledding members for steering the convertible sled, wherein the body further comprises:
   a cutaway portion on each side of the front portion of the body such that, when the convertible sled is arranged in the first configuration, the cutaway portion on a respective side of the body provides sufficient clearance for the steering wheels on the respective side to pivot at least plus or minus 40° from a direction extending along a longitudinal axis of the body of the convertible sled.

17. The convertible sled according to claim 16, wherein the braking unit is removable when the convertible sled is arranged in the second configuration.

* * * * *